W. H. DURYEA.
FILTER.
APPLICATION FILED AUG. 17, 1916.
1,271,681.
Patented July 9, 1918.
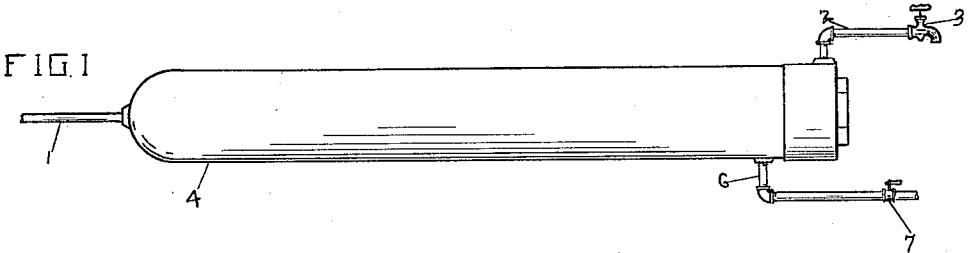
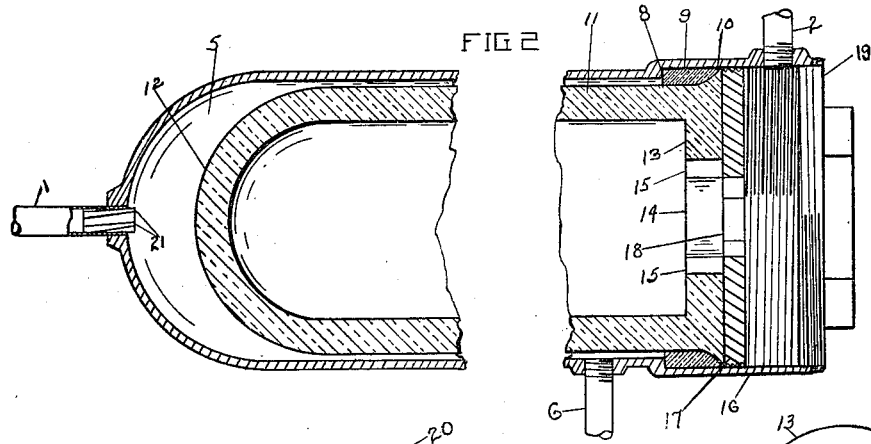
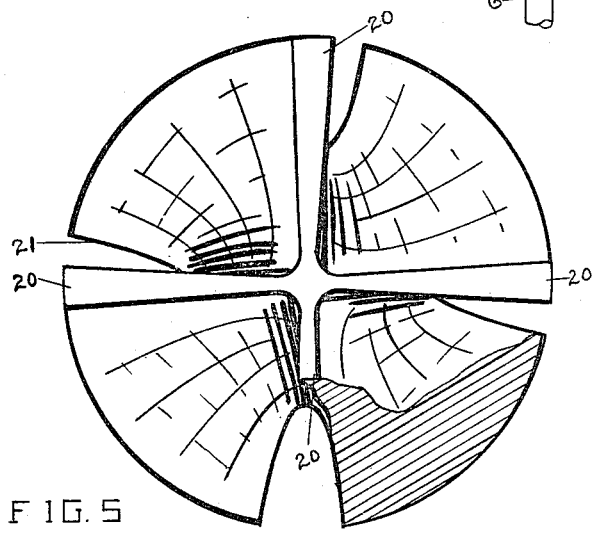
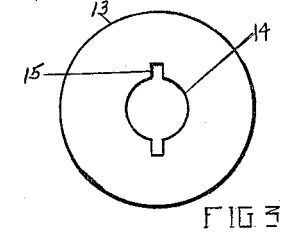
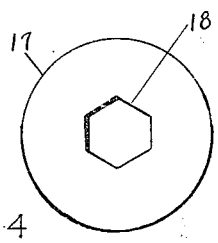
William H Duryea, Inventor

UNITED STATES PATENT OFFICE.

WILLIAM HENRY DURYEA, OF TIFFIN, OHIO.

FILTER.

1,271,681. Specification of Letters Patent. Patented July 9, 1918.

Application filed August 17, 1916. Serial No. 115,390.

*To all whom it may concern:*

Be it known that I, WILLIAM H DURYEA, a citizen of the United States of America, residing at Tiffin, Seneca county, Ohio, have invented new and useful Filters, of which the following is a specification.

This invention relates to removing suspended matter from liquids.

This invention has utility when incorporated as a filter in water service lines, especially for domestic purposes.

Referring to the drawings:

Figure 1 is a side elevation of an embodiment of the invention as incorporated in a water service line for domestic use;

Fig. 2 is a fragmentary sectional view, on an enlarged scale, of the device of Fig. 1;

Fig. 3 is an end elevation of the permeable chamber member or filter proper;

Fig. 4 is an end view of the holding nut coacting directly with the filter member proper; and Fig. 5 is a view, on an enlarged scale, from the intake end of the swirl supply device.

The service water line 1, normally leading by pipe 2 to the spigot 3, may have interposed therein as convenient in vertical or horizontal position, the main housing 4 forming the main chamber 5 therein. Outlet 6 from this main chamber has its flow controlled by cut off valve 7 in blowing off the waste to the sewer and is disposed to take flow from the entire horizontal main chamber.

The housing 4 has its end remote from the supply line 1, provided with the internal shoulder 8 against which may seat the compressible gasket or packing 9 with which may coact the enlarged portion 10 of the cylindrical, permeable auxiliary chamber 11 having its end 12, adjacent the supply line 1, reduced and closed and its end 13 within the enlarged portion 10, provided with a cylindrical opening 14 having wings 15 in which may be inserted a T-shaped member for rotation out of registry with the wings 15 and then pulled, for withdrawing the auxiliary permeable chamber from the main chamber 5.

The enlarged portion 16 of the housing 4 is internally threaded and may be engaged by the nut 17 having the central hexagonal recess 18 registering with the permeable chamber opening 14. With a tool placed in the hexagonal recess 18, the nut 17 in portion 16 may be rotated to drive this nut 17 against the head of the permeable chamber in forcing this chamber against the gasket 9 to make a liquid tight joint between the chamber 5 and the inside of the auxiliary permeable chamber 11. This accordingly serves to isolate the chambers from each other except through the walls of the auxiliary chamber 11, permeable to liquid. This chamber 11 has its walls formed of earth material of a composition formed and then fused to resist transmission of even the finest particles in suspension while allowing quite rapid seepage of water therethrough. The particles are molded to form and in the heat treatment there is a more or less extensive fusing or agglomeration in giving the member a substantial form. The treatment of this earth provides a refractory permanent unit to which the sediment will not cling and from which it is readily washed in the blowing off.

Spaced from the nut 17 is the plug 19 closing the end of the housing 4 and thereby leaving the chamber in communication with the line 2, so that opening spigot 3 on the pressure system will result in a continuous supply of clear water. Occasionally, as may be found desirable and according to the amount of sediment or material in suspension in the water, the cock 7 may be manipulated to blow off the accumulated suspended matter or sediment. The device is permanent and in use needs no other attention than occasional blowing off.

Frictionally anchored by a driving fit in the pipe 1, is the swirl device embodying at its intake end, the four wings 20, providing ways narrowing in a spiral or rotary progress to form at the delivery end, the nozzles 21, thereby tending to give the incoming liquid from the service line 1 a rotary motion effective to wash any deposit of sediment off the outside the chamber 11 so that in the blowing off through line 6, the accumulated material is effectively removed generally throughout the chamber 5,

What is claimed and it is desired to secure by Letters Patent is:

A filter comprising a housing providing a main chamber, a permeable wall auxiliary chamber mounted in the main chamber and having a hemispherical end, and a multiple stream providing swirl inlet axially beyond the auxiliary chamber and terminally directed upon the hemispherical end of the auxiliary chamber to wash the chamber, and an outlet from the main chamber remote from the inlet to permit removal of waste from the main chamber as washed by the inlet.

In witness whereof I affix my signature.

WILLIAM HENRY DURYEA.

Copies of this patent may be obtained for five cents each, by addressing the "Commissioner of Patents, Washington, D. C."